United States Patent [19]

Hall

[11] 4,428,757
[45] Jan. 31, 1984

[54] SONIC ENERGY FLUID DEGASSING UNIT

[76] Inventor: Mark N. Hall, P.O. Box 162, College Place, Wash. 99324

[21] Appl. No.: 304,459

[22] Filed: Sep. 22, 1981

[51] Int. Cl.³ .............................................. B01D 51/08
[52] U.S. Cl. ...................................... 55/277; 210/188; 210/748; 55/15
[58] Field of Search ..................... 55/15, 277; 210/188, 210/199, 748

[56] References Cited

U.S. PATENT DOCUMENTS

| | | | |
|---|---|---|---|
| 2,620,894 | 12/1952 | Peterson et al. | 55/15 |
| 2,967,763 | 1/1961 | Doman et al. | 210/199 |
| 3,193,989 | 7/1965 | Sebeste | 210/188 |
| 3,255,571 | 6/1966 | Walker et al. | 55/277 |
| 3,335,082 | 8/1967 | Ullrich | 210/199 |
| 3,429,743 | 2/1969 | Branson | 55/15 |
| 3,696,929 | 10/1972 | Shah | 210/199 |
| 3,853,500 | 12/1974 | Gassmann et al. | 55/15 |
| 3,904,392 | 9/1975 | Van Ingen et al. | 155/277 |
| 4,339,247 | 7/1982 | Faulkner et al. | 55/15 |

Primary Examiner—Bernard Nozick
Attorney, Agent, or Firm—Darrell E. Hollis

[57] ABSTRACT

A gas stabilization unit eliminates unwanted gaseous material and adds desired gaseous material from a fluid stream by applying sonic vibrations in two stages to create readily removable bubbles of the gaseous material. A siphon assembly located downstream removes the bubbles.

18 Claims, 6 Drawing Figures

SONIC ENERGY FLUID DEGASSING UNIT

BACKGROUND OF INVENTION

This invention relates to fluid gas stabilizing units, and particularly to the use of sonic energy units.

Gas stabilizer units have general application in water quality control systems in which there is an effort to maintain dissolved gases in the fluids at a desired minimum level.

One of the areas of application for such units is in the treatment of waters used for fish rearing. Such waters must have certain standards of gaseous equilibrium and content to meet standards required for aquaculture.

Another use for a gas stabilizer unit is in the processing of aerobic and anarobic sewage systems which require an acceptable level of entrained gaseous material.

A still further use would be in the stabilization of dissolved gases in natural gas recovery.

In prior methods of producing gaseous equilibrium, packed columns, and side draft aerators were used. These systems have the basic drawback of requiring, because of their size and construction, a substantial operating pressure, and a great deal of maintenance.

SUMMARY AND FEATURES OF INVENTION

Accordingly, it is a principal feature of this invention to provide a more efficient and substantially more economical gas stabilizer unit for controlling the amount of dissolved gases in fluids.

A feature of this invention is to apply sonic waves to a fluid containing unstable gaseous elements to create equilibrium thereby eliminating supersaturated elements and stabilizing unsaturated elements to desired values at a given pressure.

Another feature of this invention is to couple a sonic stabilizing device with a siphon section to provide for more effective removal of entrained gas bubbles created by the sonic waves.

A further feature of this invention is to provide a new type of arrangement of sonic transducer units for use in removing gaseous elements from the fluid.

Another feature of this invention is to provide a degasser unit device for fluids which has the capability of adding desired chemicals or material during the process of removing gaseous material from such fluids.

A still further feature of this invention is to provide a gas removal device for fluids in which waters used for fish-rearing may be restored by extracting nitrogen gas and, if desired, adding of oxygen to the fluid under treatment.

Another feature of this invention is to provide a stabilization system which is more economical than the stabilizer units provided by methods in use currently.

A further feature of this invention is to provide a fluid treatment unit used for extraction of gases from fluids which requires little maintanance.

A still further feature of this invention is to provide a stabilizer unit which provides control and stabilization not possible with prior used systems.

These and further features and advantages of this invention will be apparent from the following description and claims.

DESCRIPTION OF THE INVENTION

Figure 1:
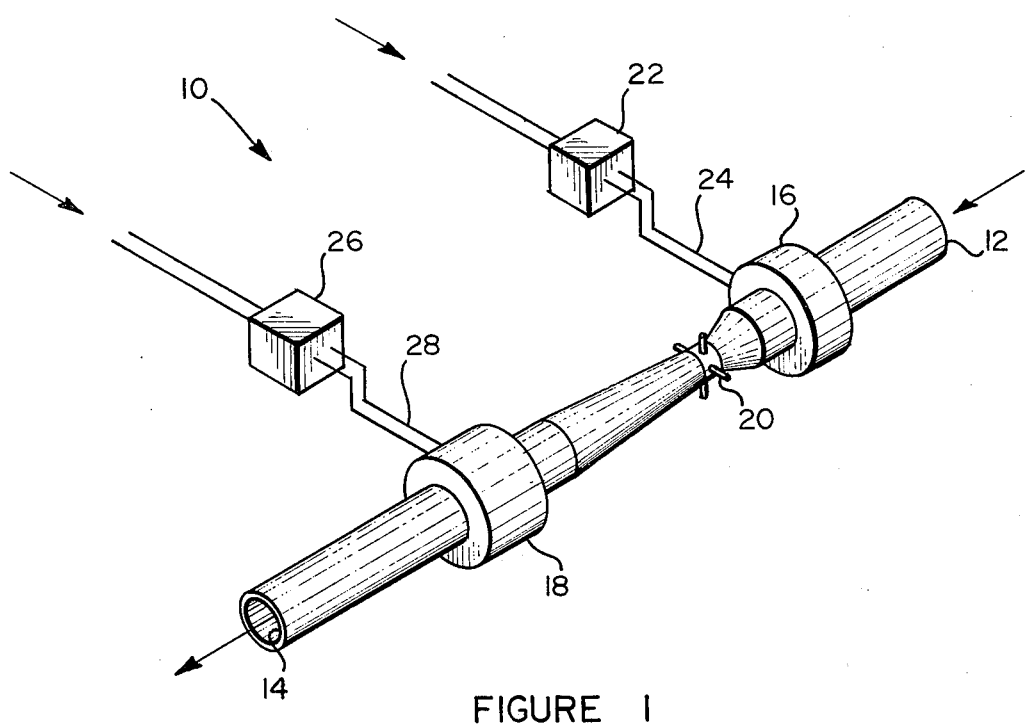
FIG. 1 is a schematic showing the major elements of the sonic energy wave stabilizer unit.

Referring to FIG. 1, the sonic energy wave degassing unit generally indicated at 10 includes a fluid supply pipe 12 which has an outlet 14 through which sonic energy treated fluid emerges after passing through the sonic energy transducer and aeration assemblies 16, 18, and 20.

Power is applied to the assemblies 16 and 18 respectively from the frequency oscillator and amplifier units 24 and 26 along lines 28.

The fluid containing enlarged gaseous bubbles from the unit is discharged from the pipe end 14 to appropriate discharge devices.

Figure 2:
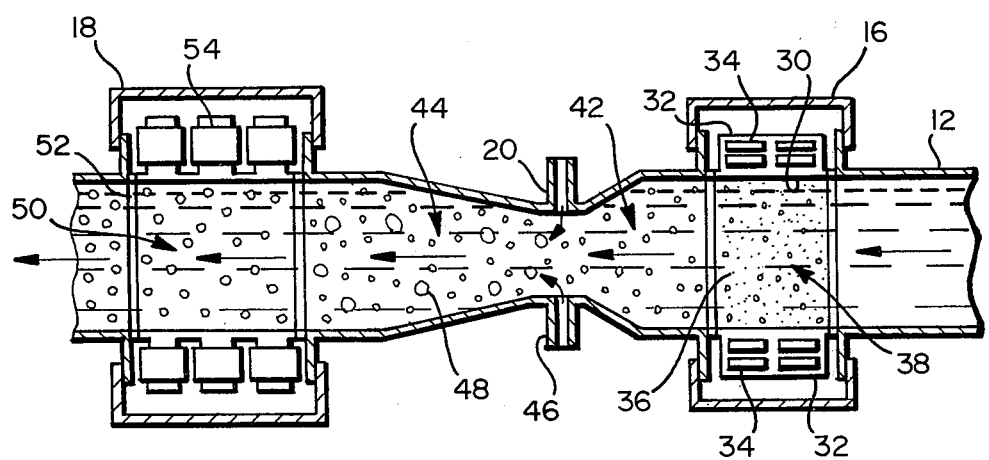
FIG. 2 is a sectional view of the sonic energy wave transducer and aspirator assembly shown in FIG. 1.

FIG. 2 is a section of the sonic energy transducer and aeration assemblies of FIG. 2 showing fluid flow proceeding from a direction of right to left. The fluid initially encounters first stage high frequency sonic generrator 16. This unit has a cylindrical high frequency sonic transducer housing 30 fabricated from aluminum with radial ribs 32. Rubber spacer gaskets are disposed between each end of the housing 30 and the adjacent fluid conduit sections. A piezoelectric transducer 34 is disposed on the ribs 32. They transmit sonic energy from the sonic transducer housing to the passing fluid. This is the initial primary gas bubble stage in which high frequency sonic waves produce small nuclei of gas 36 in the standing wave zone 38 within the immediate confines of the cylindrical housing 30. The high frequency sonic generator 16 develops in this zone a standing wave having a frequency and intensity that is matched with the frequency and intensity of the standing wave developed in zone 50 by the low frequency generator stage 18.

The venturi 20 has a throat ratio such that adequate vacuum is achieved at the throat to permit unassisted addition of foreign material through inlets 46. This material is then mixed with the microbubbles created in zone 38 by means of turbulence generated within the diverging cone area 44 of venturi 20. The low frequency housing 18 is of similar construction to the high frequency housing 16 except that it has larger transducer components. This is the second stage secondary bubble enhancing unit which generates lower frequency acoustic waves capable of nucleation of microbubbles in the fluid passing therethrough. It is of cylindrical construction having flanged ends and rubber spacer plates 52 that isolate the seal and sonic transducer housing 18 from the adjacent sections of pipe. The low frequency magnetostrictive assemblies 54 produce low frequency vibrations which are transmitted through the housing to the passing fluid stream. These vibrations act upon the bubble nuclei previously nucleated in zone 38 thereby expanding and imploding them, creating shock waves of high intensities. These shock waves disrupt the larger gas bubbles 48 introduced in the venturi orifice 46 thereby expanding their surface area to allow for a more rapid diffusion of unsaturated gases into the liquid. A further function of the low frequency sound zone is to enlarge microbubbles generated in zone 38 to a new resonant discharge size. This discharge size is determined after the appropriate bubble extraction unit has been selected.

Figure 3:
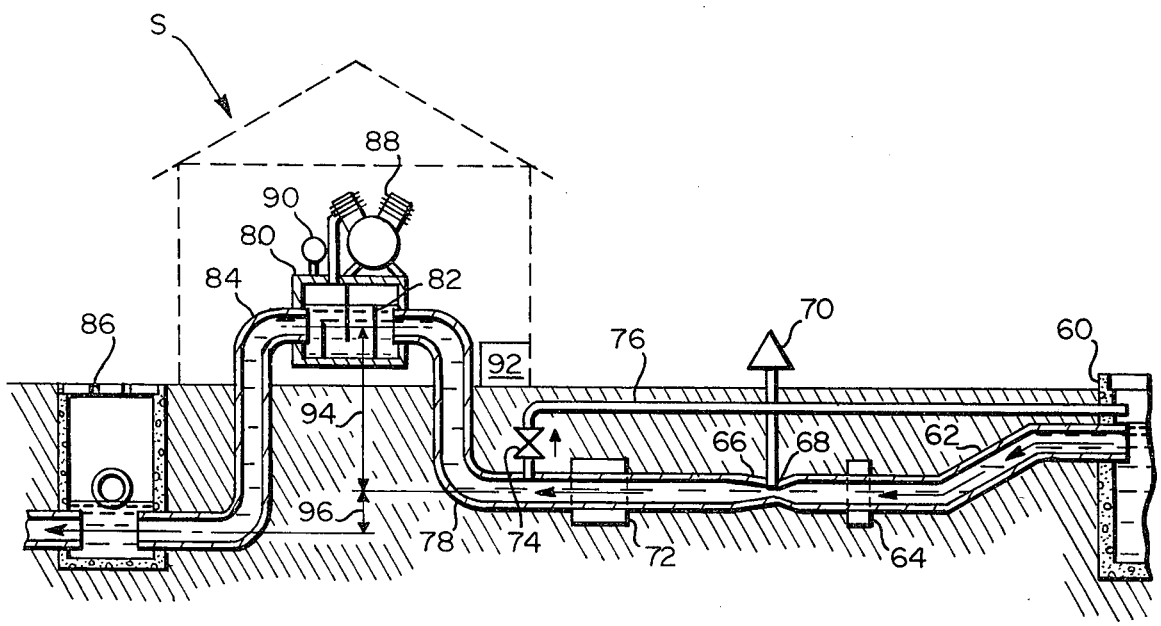
FIG. 3 is a schematic sectional view of the preferred stabilization unit installation which includes a gas removal siphon unit positioned downstream of the multi-stage sonic stabilizer unit.

An asonicsiphon stabilizing system is shown in FIG. 3. This installation has particular application to treatment of fish hatchery water. The water to be treated is passed from a pressure stabilizing tank 60 to a system inlet conduit 62 which is directly connected with the first sonic energy stage 64. This is a primary high frequency energy wave generator which generates energy from a piezoelectric transducer. Typically, they will operate at a frequency of approximately 53 Khz ±10 Khz, although this may vary depending upon the application. These high frequency sonic energy vibrations will initiate the generation of gas bubble nuclei in the passing fluid stream. The construction and operation of the first stage 64 is similar to the high frequency resonator tube 16 shown in FIGS. 1 and 2.

A venturi 66 is positioned downstream of the high frequency generator 64. This unit provides the capability of adding chemicals at the venturi throat, or air by aspiration through unit 70. The back pressure produced by this venturi-type aspirator unit is balanced by the pressure in the tank 60. This back pressure compensates for the head or water pressure loss encountered when the fluid passes through venturi 66. The vertical displacement that exists between the outlet to tank 60 and venturi 66 supplies this lost head or water pressure thereby balancing the pressure within the system.

A venturi aspirator 66 is preferably constructed with a compression angle ratio of three to one. The internal diameters of the first and second sonic generator stages are approximately equal in cross-sectional area.

The second stage is a low frequency sonic energy generator 72 which is similar in construction to the low frequency generator assembly 18 shown in FIGS. 1 and 2. Typically, it operates at a frequency 8 Khz ±2 Khz, but the value will vary depending upon the application. Control check valve 74 provides for pressure relief and adjustment compensation with respect to the downstream portion of the low frequency second stage and the fluid storage area.

A siphon unit is positioned immediately downstream of the second stage low frequency sonic energy wave generator 72. It has an upstream upwardly extending siphon section 78. A central enlarged cavity section 80 is connected to upstream siphon section 78 and has a cylindrical baffle assembly 82 through which the fluid circulates. The downstream siphon leg 84 carries the flow downwardly from the enlarged cavity section 80 to the pressure stabilizing tank 86.

The gases that accumulate in the upper central section of the siphon 80 are pumped off through the air compressor, or a vacuum pump 88 thereby preventing a loss of siphon flow resulting from a gas lock. Liquid level controller 90 is mounted directly on the central section 80. This section of the installation can be housed in the shack generally indicated at S in dotted outline. The shack may also contain the frequency generating equipment generally indicated at 92.

For a typical siphon arrangement, the head 94 may be approximately four feet. The medium liquid level is maintained by the pressure level controller 90 to prevent air locking. The outflow line level at the end of section 84 is disposed a small distance below the level of the intake of the upstream siphon section 78.

The central section 80 might be described as a siphon bubble extractor section which operates at approximately one atmosphere negative pressure while the lower pressure at either end of the siphon is approximately one atmosphere.

Figure 4:
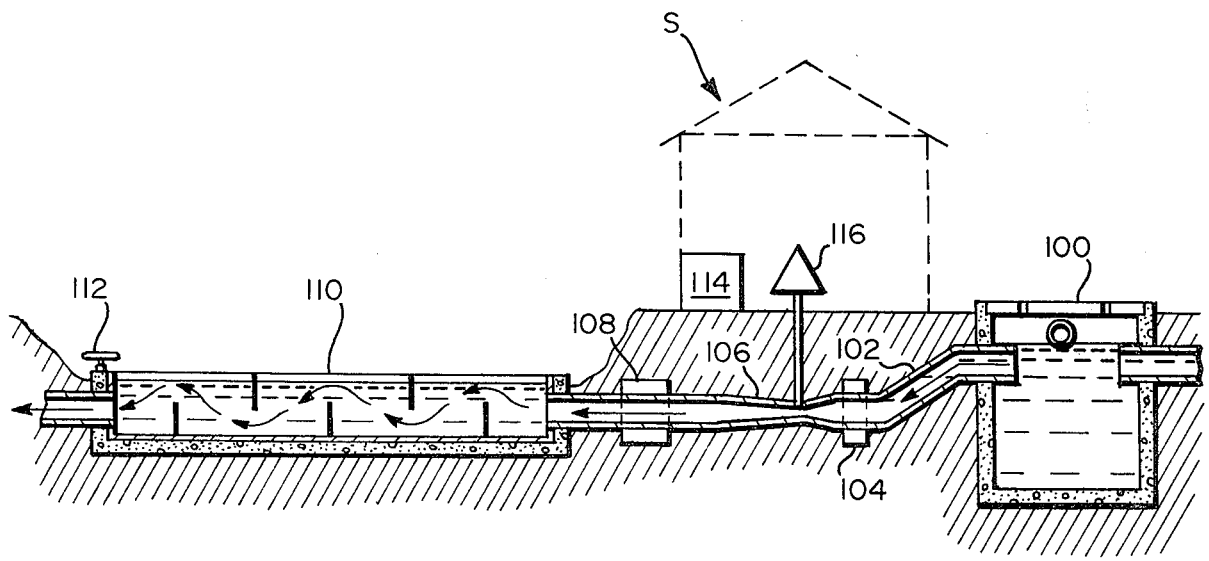
FIG. 4 is a schematic sectional view of a stabilization unit installation which includes a gas removal purge tank unit positioned downstream of the multi-stage sonic stabilizer unit.

An asonicpurge stabilization system is shown in FIG. 4. This installation also has specific application to treatment of fish hatchery water. The advantages of this system over the asonicsiphon system are: lower head loss, less complicated operation, lower maintenance required, and less danger of total system failure. The disadvantages of this system over the asonicsiphon are: no gas recovery after separation of medium, must operate at high power consuming frequencies and intensities, acoustic equipment is considerably more expensive due to lower operating frequencies, and separation tank requires more room for installation.

The water to be treated is passed from a stabilizing unit 100 to an inlet conduit 102. This conduit is directly connected to a high frequency resonator 104 which is directly connected to a venturi 106 which is directly connected to a low frequency transducer 108 in series. These components are identical in function and location as those illustrated in FIG. 3. However, they have lower operating frequencies. The treated water than is channeled into a large tank 110 having a surface area adequate for discharge. This tank's liquid level is controlled by a valve 112 located at the end of the system.

The liquid is then returned to the mainstream by a conduit directly connected to the control valve 112 at the end of the system. The system's oscillation driving equipment 114 and gas control valves 116 are located in a shack labeled S.

Figure 5:
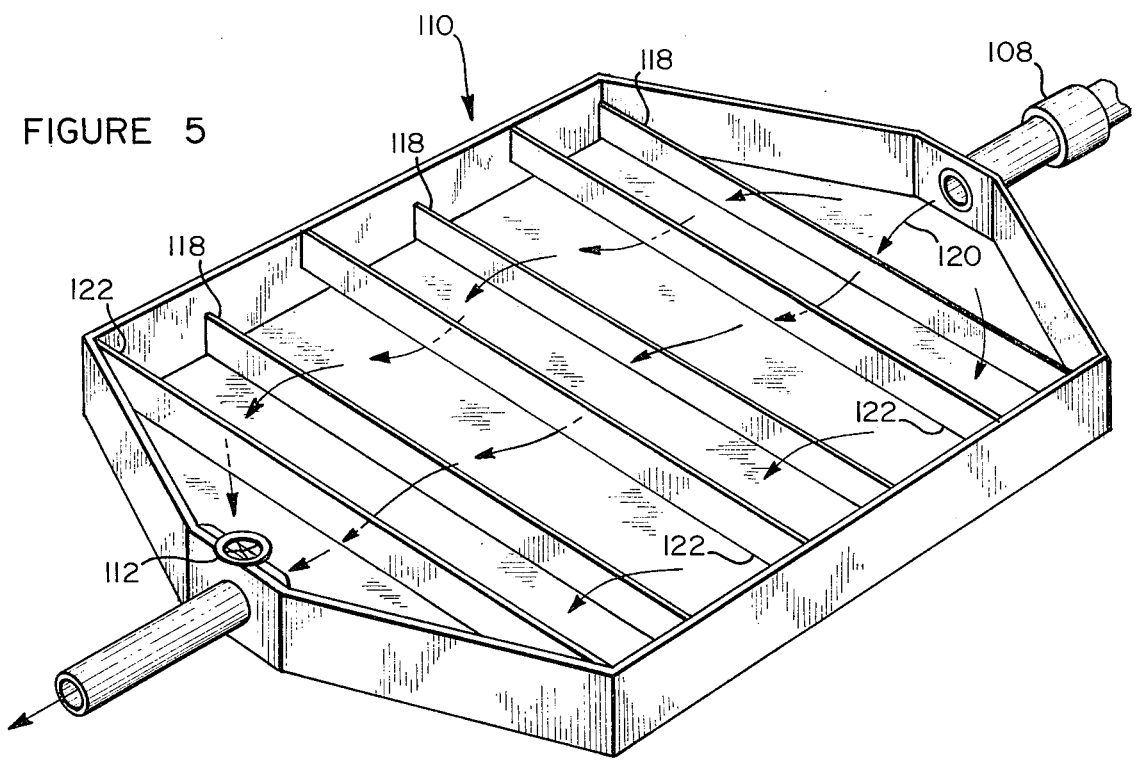
FIG. 5 is a schematic to further illustrate the basic components of the purge tank configuration.

FIG. 5 is a perspective view of the asonicpurge tank 110 illustrating the over-under principle of baffle location, using horizontally mounted low plates 118 over which the fluid flow 120 passes, and alternating higher plates 122 under which the fluid flow 120 passes.

Figure 6:
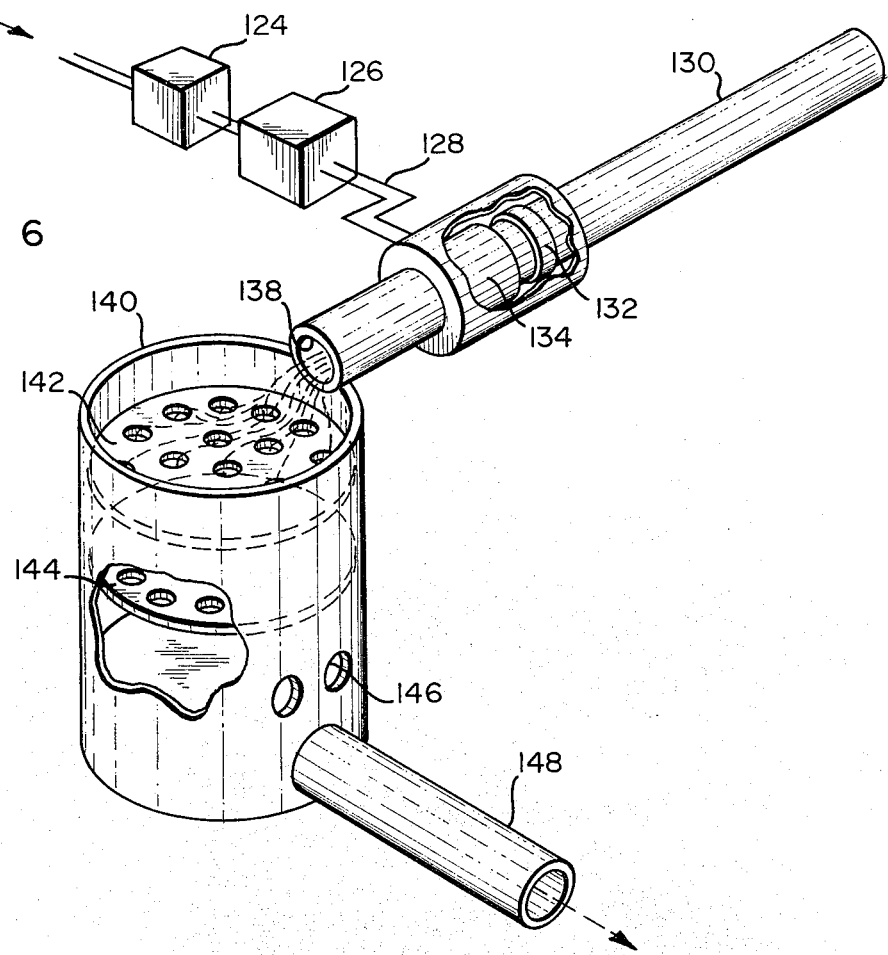
FIG. 6 is a schematic sectional view of a stabilization unit which includes a gas removal packed-column unit positioned downstream of the multi-stage sonic degasser unit.

FIG. 6 is a schematic of a sonic degasser unit coupled to a mechanical pack column discharge system. The advantages of this total system are that it may, under total electric failure to sonic equipment, still aerate and degass to some extent by features incorporated into the packed column. A further advantage would be its rapid adaptability to existing gas control units. Its major disadvantages, however, are the large head required for operation, and maintenance of equipment components in packed column.

In this system the frequency oscillator 124 and amplifier 126 supply a signal through lines 128 for the high frequency resonator 132 and the low frequency resonator 134.

The fluid containing supersaturated dissolved gasses is introduced to the apparatus by means of a conduit 130 directly connected to a high frequency resonator 132, is directly connected to a lower frequency resonator 134 followed by a second conduit 138 which serves as a mechanical discharge outlet. The fluid containing enlarged gaseous bubbles is discharged from the discharge outlet 138 into a packed column 140. It then passes downwardly to the bottom of the housing with the bubbles coming out of the fluid stream by floating to the top. Near the bottom section of the housing 140 vent openings 146 permit incoming air to enter the column. The treated fluid without the bubbles is withdrawn from the packed column through the outlet pipe 148.

The transducers will allow high energy efficient transfer from the power supply to the working fluid in high frequency ranges with piezoelectric transducers, and magnetostrictive transducers will perform the same function for the low frequency ranges.

OPERATION

This device has particular application with respect to the extracting of nitrogen from aqueous solutions by the use of sonic energy. Frequencies used are in both the sonic and ultrasonic ranges. As indicated in FIG. 3, one of the particular applications of this technique is to promote the equilibrium in fish rearing water supplies to meet acceptable standards for aquaculture. In these instances, the supersaturated levels of nitrogen and argon gases are allowed to come to equilibrium. Sonic energy waves applied to the passing fluid stream by the first and second sonic generator stages, because of the shock waves, produce large bubbles in the stream which can then be mechanically removed by either a siphon, purge tank, or packed column arrangement.

In the system shown in FIG. 4, a purge tank is used in which the bubbles are large enough to float to the top of purge tank 110 when the fluid stream passes therethrough.

The sonic energy generating transducer units 16 and 18 are supplied with frequencies generated by the oscillator and amplifiers 22 and 26, respectively. The first and second stage acoustic energy generating units are similar in function and location; however, they differ in design. The first high frequency acoustic system generates an ultrasonic signal which is linearly amplified and transmitted to the medium by piezoelectric transducers 34 and resonator 16. The frequency and intensity at which this unit resonates is such to produce micro-bubbles with a maximum radius of a few microns. The second low frequency acoustic system generates a sonic signal which is linearly amplified and transmitted to the medium by magnetostrictive transducers 54 in resonator 18. The frequency and intensity at which this unit is to resonate at is such as to produce bubbles with a maximum radii large enough as to supply a buoyant force adequate for discharge. This radius will be determined after total system design is made.

The change in character of the fluid stream can be seen in FIG. 2 in which the material in the area 30 within the first stage unit 16 begins to have small bubble nuclei 36. The high frequency sonic waves mechanically create bubble nuclei by reason of the reduced pressure in the liquid during the negative part of the sound shock wave passing through the fluid. This allows the bubble nuclei to grow, by rectified diffusion of gas, out of the medium and into a gas bubble. The bubbles grow progressively larger with the increasing number of shock waves applied.

It will be seen that the bubbles in the intermediate connecting venturi are larger than those in the first stage, and that the bubbles progressive grow as indicated by bubbles in area 50 in the second stage due to reflected dispersing shock waves. Micro-bubbles are mixed together along with larger added foreign gas bubbles taken in at inlet 46 and then dispersed evenly in the diverging venturi cone 46. The mix then encounters low frequency shock waves of larger amplitude in area 50 where shock waves of high magnitude rupture the larger gas bubbles 48 introduced at 46. This stage not only enlarges the average micro-bubble radius generated at 38 but also increases surface area of foreign gas bubbles introduced at 46 thereby accelerating gas outflow to the unsaturated medium. The type of system selected will regulate the medium exposure time to meet efficiency demands for degassing and aeration. In this instance the amount of energy required to force supersaturated levels of nitrogen gas out from water solution to the gas stage to initiate primary gas bubble nuclei formation, and at a substantially lower frequency for the secondary stage to promote bubble growth formation from the nuclei at the exact and most efficient values, as well as the amount of energy required to force the gases from solution to the gas state with sufficient bubble diameters for removal by packed column or other type of units, will depend upon the type of installation.

The sonic resonator units are preferably made of aluminum and have radially finned or ribbed members integral therewith. However, different types of metal can be employed. The circular configuration maximizes the standing wave pattern inasmuch as the sonic energy vibrations are fed radially into the tube from a plurality of transducer support ribs 32 to produce a standing wave pattern. This arrangement provides for maximum efficiency by permitting lower power inputs. The length of the intermediate conduit between the two stages is also of consideration and should allow some transit time for the bubbles to begin their growth. The conduit might be termed an intermediate growth zone which permits a few seconds lapse between first and second sonic energy application points.

The first high frequency energy stage preferably used piezoelectric transducers to permit high energy transfer to the working fluid, while the low frequency gas bubble growth stage using low frequencies uses a magnetostrictive type transducer. The high frequency first stage sonic energy resonating tube creates micro-bubbler nuclei needed to begin the bubble formation process. The second stage enlarges the bubbles which begin to form as a result of the further application of sonic energy at a much lower frequency.

If the induced bubbles in the fluid stream are relatively large, the asonicpurge or packed column removal unit of FIGS. 4 and 6 can remove such bubbles after the two-stage sonic irradiation of the fluid. However, where the bubbles are smaller and more efficient bubble removal is sought, the sonic siphon assembly shown in FIG. 3 is used. Its central section has an elevation that will magnify the bubble diameter in the stream to bring about further magnification of the bubble diameters which are of such size to produce a strong enough buoyancy for complete discharge in the baffle section of the siphon. This magnification of bubbles results from a reduction in the pressure exerted of the bubbles by the fluid. The fluid pressure is reduced when the fluid flows to the apex of the siphon. By utilizing the mechanical assist siphon, as opposed to the sonic generator, to manify the gas bubbles an energy savings results. The gases that are discharged from the section are removed by the compressor 88, or a vacuum pump.

The flow-through underground unit of FIG. 3 is of simpler and smaller construction than would ordinarily be required for its rated capacity. In addition, it does have the ability to separate super-saturated gases while simultaneously adding chemicals or gases at its venturi section. For example, in fish rearing water, it is possible in this installation to remove the nitrogen gas and to introduce oxygen or other chemicals simultaneously.

This type of underground water treatment installation has the advantages of not requiring a head tank, nor packed columns. It also has a lower surge tank, and much higher efficiency ratings for degassing and aeration. It is also readily adaptable to existing systems. Its advantage over the packed column, noted previously, is the ability to remove smaller gas bubbles which ordinarily would not float to the top surface of the fluid stream.

The system itself is much more power efficient, has greater stabilization and capability and requires less maintenance than previously used conventional systems designed for such purposes.

Referring to FIG. 3, it should be noted that it is possible to also vertically mount the transducers rather than position them in a horizontal orientation to take advantage of the downflow aeration effect in processes requiring addition of solutions to the fluid stream. Adjustment of the height of the apex level 82 of the siphon construction with reference to the in-line elevation of the supply conduit shown by dimension 94 will vary magnification power to the assembly. It is also possible to use more than two sonic generating units with smaller diameters to bring about the said exposure time for bubble growth.

With respect to FIGS. 4 and 5, the preferred cross-sectional configuration is circular, although other configurations are possible, such as an octagonal shell, or an omni-directional configuration consisting of a pulsating energy source originating from a central portion of the pipe. It is also possible to use different alloys of metals such as stainless steel or titanium, or to use other types of compatible materials.

While this invention has been described, it will be understood that it is capable of further modification, uses and/or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:
1. A sonic energy fluid degassing unit, comprising
   a. a conduit through which fluid containing entrained gases flows;
   b. a sonic energy transducer assembly having at least two spaced apart sonic energy generators each having a different frequency, said different frequency decreasing from one said sonic energy generator to the next in the direction of said fluid flow, connected to the conduit for applying sonic vibration to the passing fluid stream in the conduit to induce growth of gas bubbles of entrained gases therein;
   c. at least one venturi located in said conduit including means for introducing foreign matter into said entrained gas fluid; and
   d. gas bubble removal means for removing the gas bubbles from the fluid stream.
2. The sonic energy fluid degassing unit as set forth in claim 1, wherein:
   a. the sonic energy generating means includes a conduit through which the fluid passes,
   b. the conduit has a plurality of outwardly radially extending ribs integrally connected with the conduit, and
   c. transducer elements are mounted on said ribs for imparting sonic energy vibrations to the ribs.
3. The apparatus of claim 1 wherein each said sonic energy generator encountered by said entrained gas fluid flow, following said at least one venturi, magnifies said foreign gas bubbles introduced at said venturi thereby dissolving the foreign gas into the entrained gas fluid.
4. The sonic energy fluid degassing unit as set forth in claim 1, wherein said sonic energy transducer assembly includes:
   a. a first stage sonic energy generator for producing and imparting a relatively high frequency vibration to the passing fluid stream to generate gas bubble nuclei,
   b. means, communicating with said conduit, for introducing foreign gaseous or other material into the gas entrained fluid; and
   c. a second stage sonic energy generator for producing and imparting lower frequency energy vibrations to the passing fluid than those of the first stage to thereby magnify the gas bubble nuclei previously generated by the first stage and to magnify and dissolve gas bubbles introduced by said foreign material introducing means.
5. The sonic energy fluid degassing unit as set forth in claim 4, wherein:
   a. the first stage produces an ultrasonic acoustic vibration frequency, and
   b. the second stage produces a sonic acoustic vibration frequency.
6. The apparatus of claim 4 further including means for providing a head upstream from said venturi to compensate for the water pressure lost by said fluid when passing through said venturi.
7. The sonic energy fluid degassing unit as set forth in claim 4 or 5, wherein:
   a. the first stage contains piezoelectric transducer means for imparting sonic vibrations to the passing fluid, and
   b. the second stage contains magnetostrictive transducer means for imparting sonic vibrations to the passing fluid.
8. The sonic energy fluid degassing unit as set forth in claim 7, wherein:
   a. the higher frequency of the first stage is approximately six times greater than the lower frequency of the second stage.
9. The sonic energy fluid degassing unit as set forth in claim 8, wherein:
   a. the first stage produces an acoustic vibration frequency of approximately 53 Khz, and
   b. the second stage produces a frequency of approximately 8 Khz.
10. The sonic energy fluid degassing unit as set forth in claim 1, 4, or 5 wherein:
    said at least one venturi is placed between the two spaced sonic generators for permitting addition of extra chemicals to the passing fluid stream.
11. The apparatus of claim 1 wherein the first of said at least two sonic energy generators encountered by said fluid generates gas bubble nuclei.
12. The apparatus of claim 11 wherein all but the first of said at least two sonic energy generators magnify said gas bubble nuclei within said fluid.

13. The sonic energy fluid degassing unit as set forth in claims 1, 4, 5, 11, 12 or 3 wherein:
   a. the gas bubble removal means is a gas removal siphon assembly having a central enlarged section which is disposed at an elevation higher than the sonic energy generating means.

14. The sonic energy fluid degassing unit as set forth in claims 1, 4, 5, 11, 12 or 3 wherein:
   a. the sonic energy generating means produces a standing wave pattern within the passing fluid.

15. The apparatus of claims 1, 4, 5, 11, 12, or 3 wherein the gas bubble removal means is disposal at an elevation higher than said sonic energy generating means whereby said gas bubbles are magnifified by the reduction of fluid pressure effected as said fluid flows from said sonic energy generating means to said gas bubble removal means.

16. The sonic energy fluid degassing unit as set forth in claims 1, 11, 12, or 3 wherein:
   a. the gas bubble removal means is an asonic siphon which has a central section of greater cross-sectional area than the fluid passages of the sonic energy generating means and is disposed at a higher elevation, and
   b. air vacuum pump means is connected to the central section of the siphon to extract bubbles from the passing fluid.

17. The sonic energy fluid degassing unit as set forth in claim 16, wherein:
   a. the asonic siphon assembly central section contains a baffle section.

18. The sonic energy fluid degassing unit as set forth in claims 4, 5, 11, 12 or 3 wherein:
   a. the sonic energy generating means produces a standing wave pattern within the passing fluid, and
   b. the sonic energy generators include a cylindrical shell through which the fluid is passed.

* * * * *